United States Patent [19]
Tseng

[11] Patent Number: 5,651,287
[45] Date of Patent: Jul. 29, 1997

[54] SHAFT COUPLING MECHANISM FOR A SEWING MACHINE

[76] Inventor: Hsien-Chang Tseng, 9th Floor, No. 13-4, Sec. 1, Da Ching Street, Taichung, Taiwan

[21] Appl. No.: 620,543

[22] Filed: Mar. 25, 1996

[51] Int. Cl.⁶ .................................................. F16H 21/52
[52] U.S. Cl. .................................................. 74/42; 112/220
[58] Field of Search .............................. 74/42; 112/199, 112/220, 221

[56] References Cited

U.S. PATENT DOCUMENTS

| | | | |
|---|---|---|---|
| 4,022,140 | 5/1977 | Lienemann | 112/220 X |
| 4,252,072 | 2/1981 | Draghicchio et al. | 112/199 |
| 4,554,840 | 11/1985 | Marchesi | 74/42 |
| 4,974,534 | 12/1990 | Eberhahn et al. | 112/199 |
| 5,237,884 | 8/1993 | Seto | 74/42 |
| 5,237,942 | 8/1993 | Satoma | 112/199 X |

*Primary Examiner*—Allan D. Herrmann
*Attorney, Agent, or Firm*—Charles E. Baxley, Esq.

[57] ABSTRACT

A shaft coupling mechanism for a sewing machine includes an eccentric secured on a rotatable shaft and includes a ring engaged on the eccentric so as to be moved up and down by the eccentric. The ring has a downward extending bar. A block is rotatably secured to the lower end of the bar and rotatable relative to the bar about a pin. The block includes a rod secured to a spindle so as to rotate the spindle in an oscillating action without a ball joint. The rotational movement of the block relative to the bar will not affect the movement of the bar.

2 Claims, 3 Drawing Sheets

SHAFT COUPLING MECHANISM FOR A SEWING MACHINE

BACKGROUND OF THE INVENTION

1. Field of the Invention

The present invention relates to a shaft coupling mechanism, and more particularly to a shaft coupling mechanism for a sewing machine.

2. Description of the Prior Art

Typical sewing machines comprise a rotatable shaft that is required to be coupled to a rotatable spindle for rotating the spindle in an oscillating action without affecting the rotational movement of the shaft. One typical shaft coupling mechanism is shown in FIGS. 5 and 6 and comprises an eccentric 11 secured to a rotatable shaft 10 and rotated in concert with the shaft 10. The eccentric 11 is rotatably engaged in a ring 71 such that the rotational movement of the shaft 10 and the eccentric 11 may cause the ring 71 to move up and down. A bolt 72 has an upper end engaged with the ring 71 and a nut 73 is engaged with the bolt 72 so as to secure the bolt 72 to the ring 71. A coupler 74 is secured to the bottom of the bolt 72 and includes a ball 75 rotatably engaged in a spherical cavity 740 thereof so as to form a ball joint. The ball 75 includes an aperture 750 formed therein for engaging with a bolt 76. Another ring 70 is secured to a spindle 20 and includes an extension 77 secured to the bolt 76 such that the upward and downward movement of the ring 71 and the coupler 74 may cause the spindle 20 to rotate in an oscillating action. However, as shown in FIG. 6, the extension 77 may be engaged with the coupler 74 when the extension 77 and the spindle 20 is rotated for more than 15 degrees such that an external force may be applied onto the coupler 74 and such that the eccentric 11 may have the tendency to be forced to be disengaged from the ring 71. It is to be noted that the ring 70 may be disengaged from the spindle 20 such that the ring 70 may not effectively drive the spindle 20 to rotate. In addition, an expert or a high technique is required for manufacturing the ball joint. It will be difficult to engage the ball 75 within the coupler 74. Furthermore, the manufacturing cost of the ball coupler is very expensive.

The present invention has arisen to mitigate and/or obviate the afore-described disadvantages of the conventional shaft coupling mechanisms.

SUMMARY OF THE INVENTION

The primary objective of the present invention is to provide a shaft coupling mechanism for moving a spindle by a rotating shaft without a ball joint.

In accordance with one aspect of the invention, there is provided a shaft coupling mechanism for a sewing machine, said shaft coupling mechanism comprises a shaft including an eccentric secured thereon and rotated in concert therewith, a ring engaged on said eccentric and including a bar extended downward therefrom, said bar including a lower end, said ring being caused to move up and down by a rotational movement of said eccentric and said shaft, a block including a notch formed therein for engaging with said lower end of said bar, said block including a rod extended therefrom, a pin engaged through said block and said lower end of said bar so as to allow said block to be rotated relative to said bar about said pin, a spindle, and means for securing said rod of said block to said spindle so as to allow said rod and said block to be rotated in concert with said spindle. The spindle is caused to rotate in an oscillating action by said rod and said block when said bar and said ring is caused to move upward and downward by said eccentric and said shaft.

The spindle includes an aperture formed therein for engaging with said rod, said rod includes a free end having a sleeve secured thereto for securing said rod to said spindle.

Alternatively, the lower end of the bar may include a groove for engaging with a flange of the block such that the block may also be freely rotated relative to the bar.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
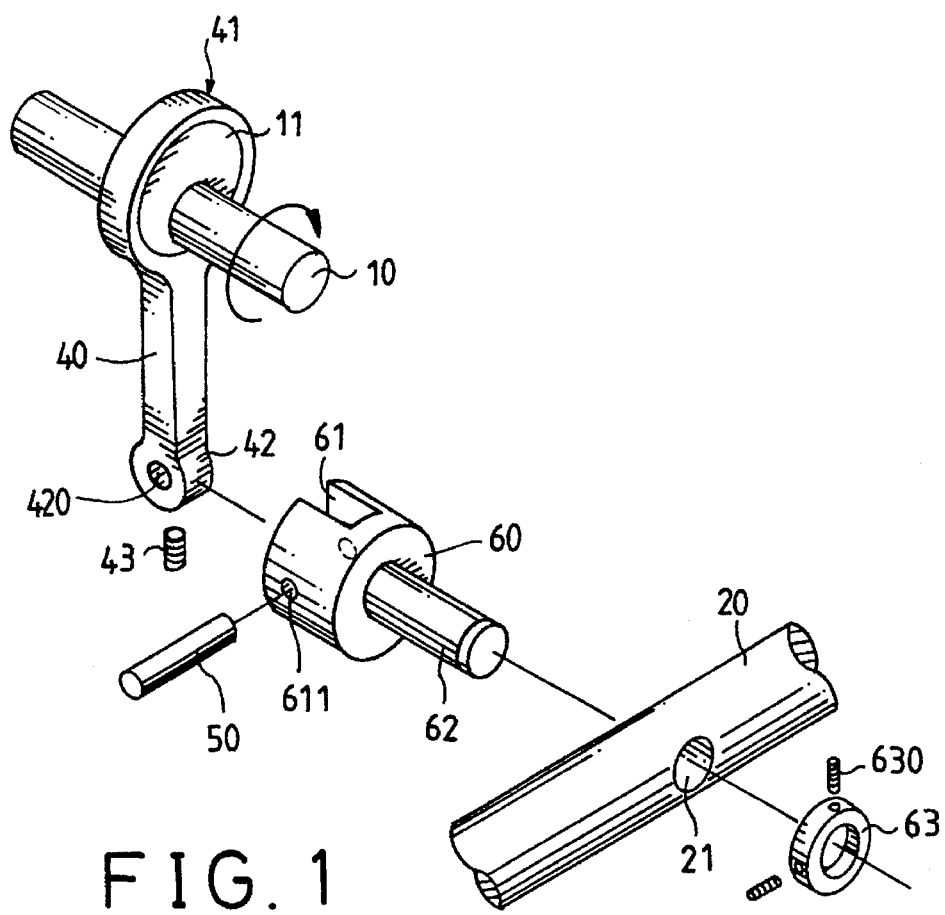
FIG. 1 is an exploded view of a shaft coupling mechanism in accordance with the present invention.
Figure 2:
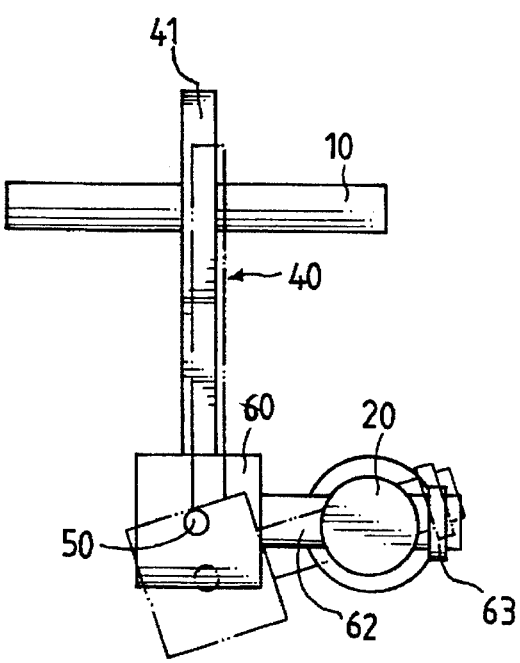
FIG. 2 is a plane view illustrating the operation of the shaft coupling mechanism.
Figure 3:
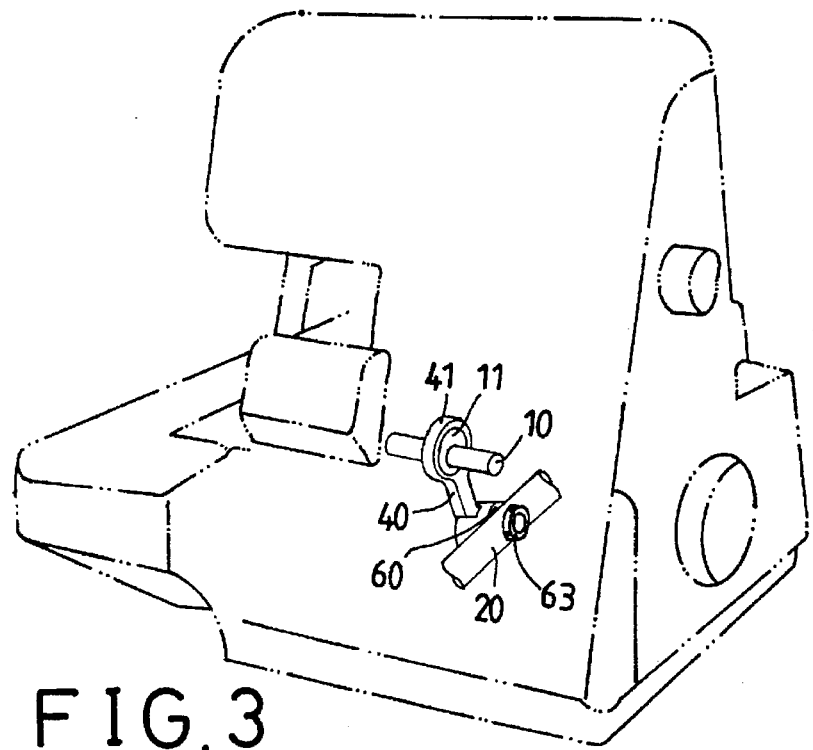
FIG. 3 is a perspective view of the shaft coupling mechanism.

Referring to the drawings, and initially to FIGS. 1 to 3, a shaft coupling mechanism in accordance with the present invention comprises an eccentric 11 secured to a rotatable shaft 10 and rotated in concert with the shaft 10. The eccentric 11 is rotatably engaged in a ring 41 such that the rotational movement of the shaft 10 and the eccentric 11 may cause the ring 41 to move up and down. The ring 41 includes a bar 40 extended downward which has a lower end 42 having a hole 420 formed therein for engaging with a pin 50. A screw 43 may engage with the lower end 42 so as to secure the pin 50 to the bar 40.

A block 60 includes a notch 61 formed therein for engaging with the lower end 42 of the bar 40 and includes an orifice 611 formed therein for engaging with the pin 50 such that the block 60 may be freely rotated about the pin 50. The block 60 includes a rod 62 extended therefrom, opposite to the notch 61, for engaging with an aperture 21 of a spindle 20. A sleeve 63 is engaged with the free end of the rod 62 and is secured to the rod 62 by screws 630 such that the rod 62 and the block 60 rotate in concert with the spindle 20.

In operation, as shown in FIG. 2, when the bar 40 and the ring 41 are moved upward and downward by the eccentric 11, the block 60 and the rod 62 may be caused to rotate about the pin 50 and about the spindle 20 such that the spindle 20 will be caused to rotate in an oscillating action. The ring 41 is slidable, along the longitudinal direction of the shaft 10, relative to the eccentric 11 for allowing the ring 41 to be slightly moved laterally between the solid line position and the phantom line position as shown in FIG. 2.

It is to be noted that the rod 62 is engaged through the spindle 20 such that the spindle 20 may be effectively rotated by the rod 62. In addition, the block 60 may be freely rotated relative to the bar 40 about the pin 50 and will not apply any external force onto the bar 40. Furthermore, no ball is required to be engaged in a spherical shaped cavity such that the manufacturing cost is greatly decreased.

Figure 4:
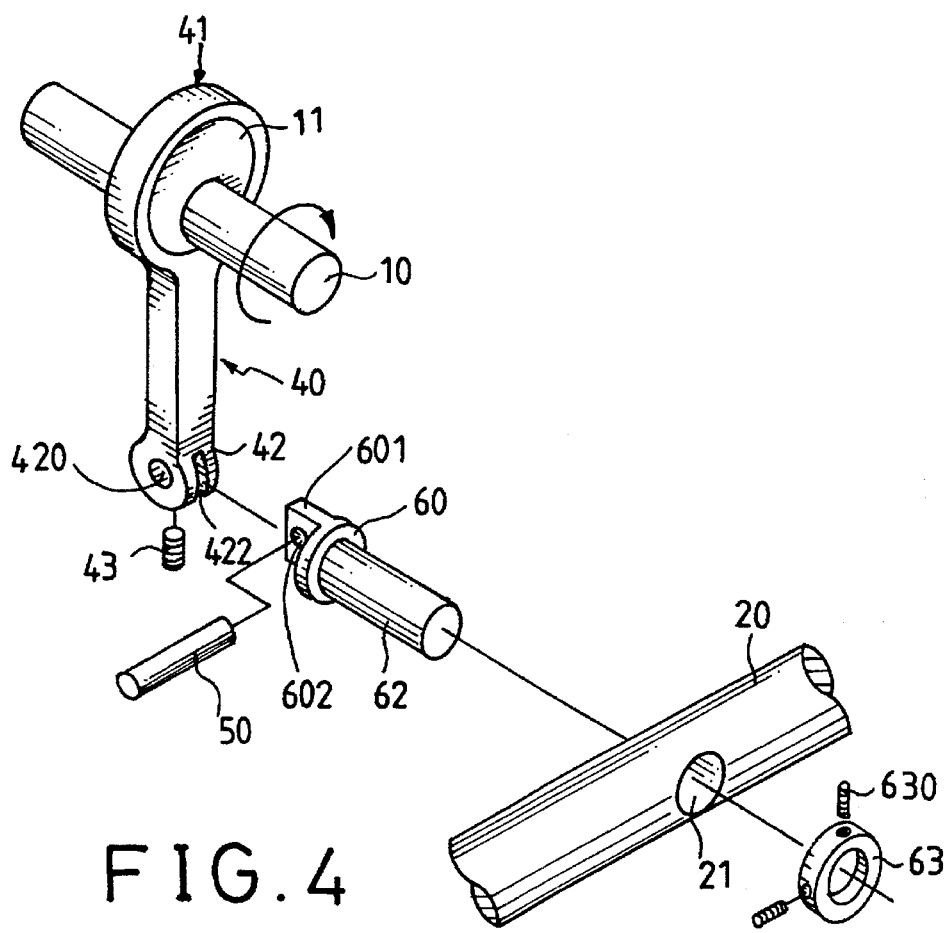
FIG. 4 is an exploded view illustrating another application of the shaft coupling mechanism.
Figure 5:
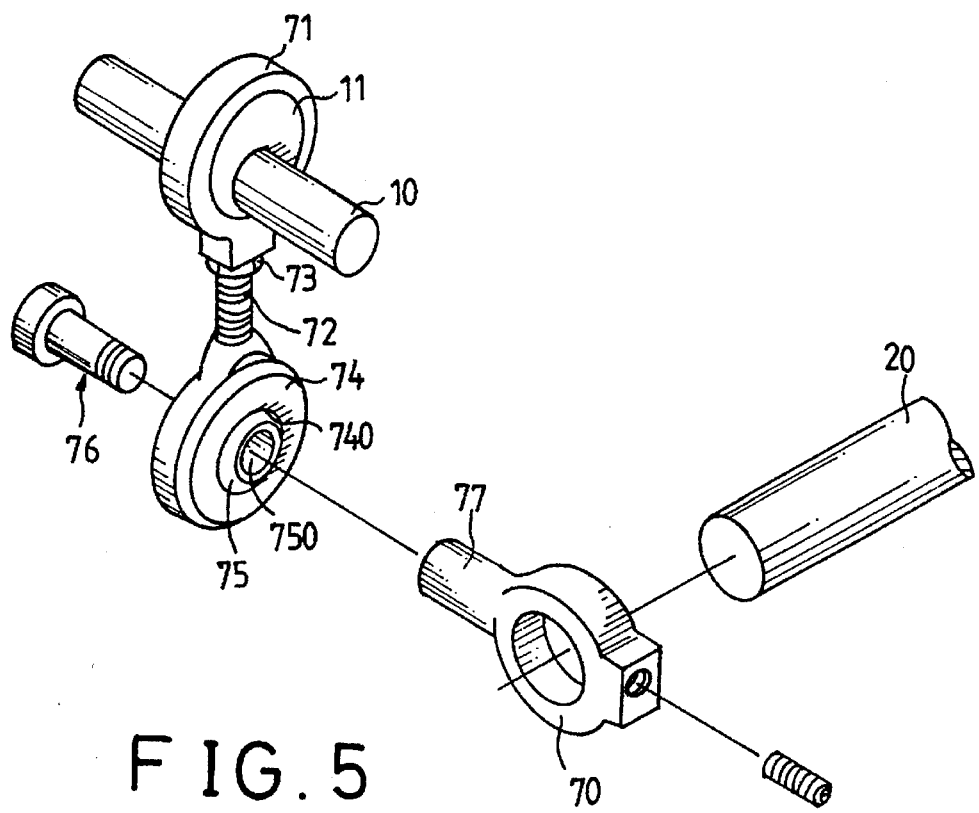
FIG. 5 is an exploded view illustrating a typical shaft coupling mechanism.
Figure 6:
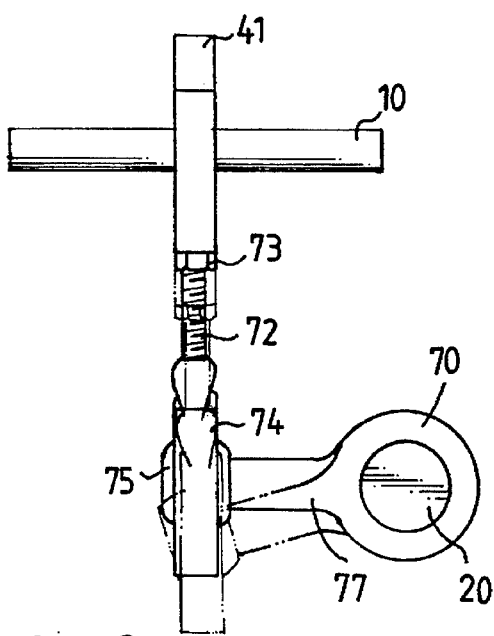
FIG. 6 is a plane view illustrating the operation of the typical shaft coupling mechanism.

Alternatively, as shown in FIG. 4, the lower end 42 of the bar 40 may include a groove 422 formed therein for engaging with a flange 601 of the block 60. The flange 601 includes an orifice 602 for engaging with the pin 50 such that the block 60 may also be freely rotated relative to the bar 40.

Accordingly, the shaft coupling mechanism in accordance with the present invention includes a block that may be freely rotated relative to the bar without a ball joint and includes a configuration having a greatly reduced manufacturing cost.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A shaft coupling mechanism for a sewing machine, said shaft coupling mechanism comprising:

a shaft including an eccentric secured thereon and rotated in concert therewith, a ring engaged on said eccentric and including a bar extended downward therefrom, said bar including a lower end, said ring being caused to move up and down by a rotational movement of said eccentric and said shaft, a block including a notch formed therein for engaging with said lower end of said bar, said block including a rod extended therefrom, a pin engaged through said block and said lower end of said bar so as to allow said block to be rotated relative to said bar about said pin, a spindle including an aperture formed therein for engaging with said rod, said rod including a free end having a sleeve secured thereto for securing said rod to said spindle, and means for securing said rod of said block to said spindle so as to allow said rod and said block to be rotated in concert with said spindle, said spindle being caused to rotate in an oscillating action by said rod and said block when said bar and said ring is caused to move upward and downward by said eccentric and said shaft.

2. A shaft coupling mechanism for a sewing machine, said shaft coupling mechanism comprising:

a shaft including an eccentric secured thereon and rotated in concert therewith, a ring engaged on said eccentric and including a bar extended downward therefrom, said bar including a lower end having a groove formed therein, said ring being caused to move up and down by a rotational movement of said eccentric and said shaft, a block including a flange for engaging with said groove of said bar, said block including a rod extended therefrom, a pin engaged through said block and said lower end of said bar so as to allow said block to be rotated relative to said bar about said pin, a spindle including an aperture formed therein for engaging with said rod, said rod including a free end having a sleeve secured thereto for securing said rod to said spindle, and means for securing said rod of said block to said spindle so as to allow said rod and said block to be rotated in concert with said spindle, said spindle being caused to rotate in an oscillating action by said rod and said block when said bar and said ring is caused to move upward and downward by said eccentric and said shaft.

\* \* \* \* \*